T. R. BAILEY.
Improvement in Key-Seat Cutting-Machines.

No. 132,239.   Patented Oct. 15, 1872.

Witnesses:
John Becker
C. Sedgwick

Inventor:
T. R. Bailey
per
Attorneys.

UNITED STATES PATENT OFFICE.

THOMAS R. BAILEY, OF LOCKPORT, NEW YORK, ASSIGNOR TO HIMSELF AND L. W. VAIL, OF SAME PLACE.

IMPROVEMENT IN KEY-SEAT CUTTING-MACHINES.

Specification forming part of Letters Patent No. 132,239, dated October 15, 1872.

*To all whom it may concern:*

Be it known that I, THOMAS R. BAILEY, of Lockport, in the county of Niagara and State of New York, have invented a new and Improved Key-Seat Cutting-Machine, of which the following is a specification:

My invention relates to improvements in that class of machines for cutting key-seats in the center holes of pulleys and gear-wheels, in which a vertical saw is used for working through the eye of the wheel while lying on the table; and the first part consists in connecting the saw to cross-head by an oscillating block journaled thereto. Second, it consists, also, in attaching saw to block by screws passing through trunnions of block into sockets of saw.

Figure 1:
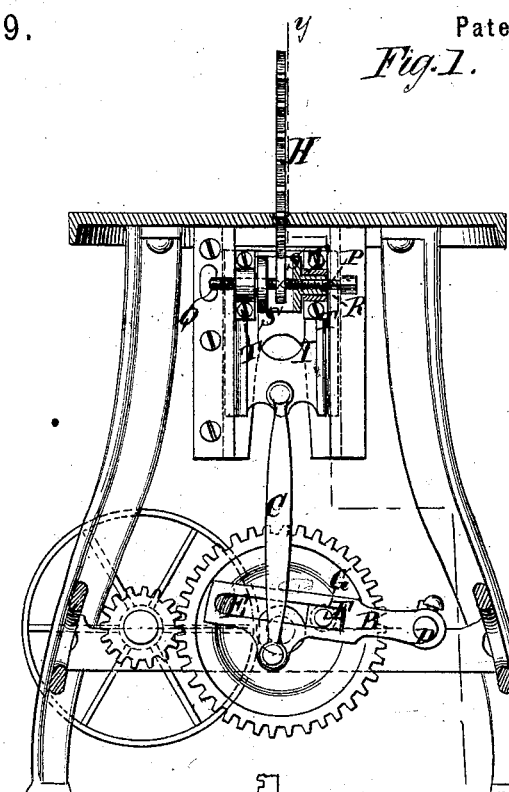
Figure 3:
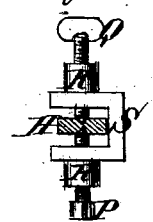
Figure 2:
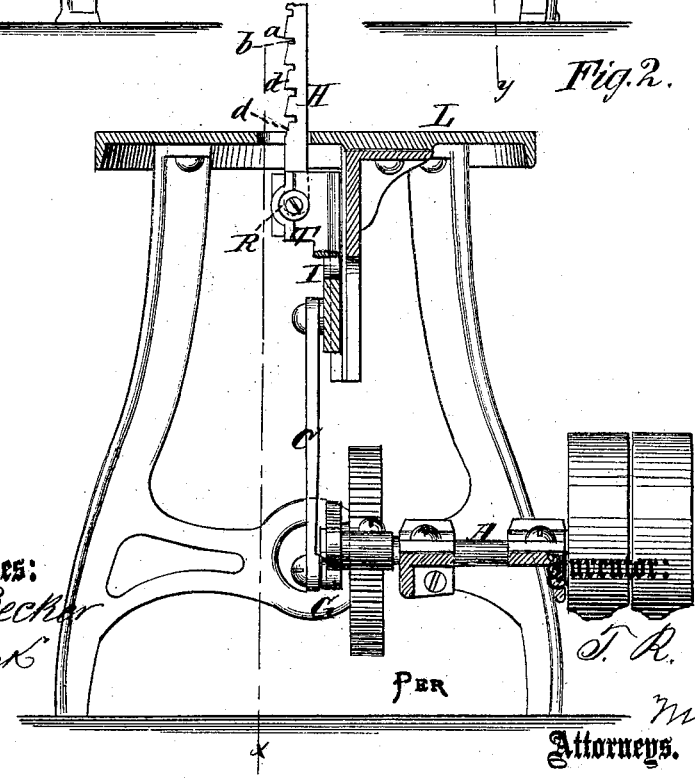

Figure 1 is a sectional elevation of the machine taken on the line $x\ x$, and Fig. 2 is a sectional elevation taken on the line $y\ y$, of Fig. 1. Fig. 3 is a detail view, showing the manner of attaching the saw to the cross head.

Similar letters of reference indicate corresponding parts.

A is the crank-shaft; B, the arm by which it and the connecting-rod C are connected together. Said arm is attached at one end to a rock-shaft, D, and has a long slot, E, in which a sliding bearing-block, F, fitted on the wrist-pin G, works. The connecting-rod C is jointed to the said arm at the middle of the slot, and the rock-shaft D is arranged in the same horizontal plane that the crank-shaft A is, all so that by the up movement of the wrist-pin, which is caused to be between the connecting-rod and the oscillating-shaft, the said arm will raise the saw in less than half a revolution of the crank-shaft, while it will require somewhat more than half a revolution to carry it down, owing to the influence of the said arm B; consequently I get by this simple contrivance the required slow motion while the saw is performing work, and the quick up movement when it is not in labor, and thus I can run the machine faster than if the up movement has to be as slow as the down movement.

To cut the key-seat on an incline or draw, and in order to be able to attach and detach the saw quickly, to save time in taking it out to sharpen, which has to be done very frequently, I propose to connect the saw to the block S by the two pointed screw-bolts P and Q, which screw into conical sockets in the side of the saw, and these bolts screw through the trunnions R, on which block S oscillates. Said block has a wide notch at the place where the points of the screws meet to admit the saw between them, and is mounted in bearings T on the saw-gate, so as to oscillate on said trunnions when the saw swings forward to form the slant or draw of the key-seat, the back of the saw bearing against the bottom of the notch in said block so as not to oscillate on the points of the screws. The saw is pressed against the work by a presser acting against the back of it above the wheel to be cut, and actuated by a hand-lever or other suitable means. In order to shape the saw-teeth so that they can be sharpened by a thin emery or other like wheel with a face perpendicular to the sides, I form the lower sides of the teeth on a line at right angles to the long axis of the saw, with a deep notch, $b$, extending below the slightly-slanting upper side $d$ of the teeth, so that the side $a$ may be sharpened on the side of the emery-wheel running in the notch $a$, and the side $b$ may be sharpened by the face of the wheel running against said side, and not having to run so near the point of the tooth above as to grind it off.

Having thus described my invention, I claim as new and desire to secure by Letters Patent—

1. The connection of the saw to the cross-head by the oscillating block S journaled thereto, substantially as specified.

2. The attachment of the saw to block S by the screws Q R, screwing through the trunnions of said block and into sockets in the saw, substantially as specified.

THOMAS R. BAILEY.

Witnesses:
ELLA WEATHERWAX,
IDA E. BROWN.